United States Patent
Du et al.

(10) Patent No.: US 10,613,657 B2
(45) Date of Patent: Apr. 7, 2020

(54) ARRAY SUBSTRATE, DISPLAY PANEL AND DISPLAY DEVICE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Lingxiao Du, Shanghai (CN); Qijun Yao, Shanghai (CN); Hong Ding, Shanghai (CN)

(*) Notice: Subject to any disclaimer, the term of this patent is extended or adjusted under 35 U.S.C. 154(b) by 681 days.

(21) Appl. No.: 15/077,919

(22) Filed: Mar. 23, 2016

(65) Prior Publication Data
US 2016/0291758 A1    Oct. 6, 2016

(30) Foreign Application Priority Data

Apr. 1, 2015    (CN) .......................... 2015 1 0152788

(51) Int. Cl.
*G06F 3/041* (2006.01)
*G06F 3/044* (2006.01)
(Continued)

(52) U.S. Cl.
CPC ............ *G06F 3/0412* (2013.01); *G06F 3/044* (2013.01); *G02F 1/13338* (2013.01); *G02F 1/136286* (2013.01)

(58) Field of Classification Search
CPC ..... G06F 3/0412; G06F 3/044; H01L 27/124; G02F 1/13338; G02F 1/136286
See application file for complete search history.

(56) References Cited

U.S. PATENT DOCUMENTS

| 2007/0109239 A1 | 5/2007 | Den Boer et al. |
| 2008/0225219 A1 | 9/2008 | Saito |

(Continued)

FOREIGN PATENT DOCUMENTS

| CN | 102193255 A | 9/2011 |
| CN | 103294312 A | 9/2013 |

(Continued)

OTHER PUBLICATIONS

The first Office Action of the Chinese corresponding application CN201510152788.2, dated Mar. 30, 2017.

*Primary Examiner* — Carolyn R Edwards
*Assistant Examiner* — Eboni N Giles
(74) *Attorney, Agent, or Firm* — Kilpatrick Townsend & Stockton, LLP

(57) ABSTRACT

An array substrate, a display panel and a display device are provided. The array substrate includes: multiple gate lines and multiple data lines, where the gate lines are insulated from and intersect with the data lines, which define multiple pixel units; a pixel electrode layer, where the pixel electrode layer includes multiple pixel electrodes, and the pixel electrodes are disposed in the pixel units; a common electrode layer, where the common electrode layer includes multiple common electrodes, and the common electrode serves as a touch electrode; and multiple auxiliary electrodes, where the auxiliary electrode is electrically connected to the touch electrode, is disposed in a different conductive layer from the pixel electrode, and overlaps with at least one of the pixel electrodes. In this way, the storage capacitance is increased, and the display device has an improved display effect as compared with the conventional technology.

18 Claims, 6 Drawing Sheets

(51) Int. Cl.
    *G02F 1/1333*     (2006.01)
    *G02F 1/1362*     (2006.01)

(56) References Cited

U.S. PATENT DOCUMENTS

| | | | |
|---|---|---|---|
| 2011/0102359 A1 | 5/2011 | Chiba et al. | |
| 2011/0227816 A1 | 9/2011 | Nakamura | |
| 2012/0218199 A1* | 8/2012 | Kim | G06F 3/0412 345/173 |
| 2013/0342770 A1 | 12/2013 | Kim et al. | |
| 2015/0153875 A1 | 6/2015 | Zhang | |
| 2015/0301381 A1* | 10/2015 | Okita | H01L 27/124 349/12 |
| 2015/0370114 A1 | 12/2015 | Du et al. | |
| 2016/0004372 A1* | 1/2016 | Nakajima | G06F 3/044 345/174 |
| 2016/0197098 A1* | 7/2016 | Xian | H01L 27/1222 257/72 |

FOREIGN PATENT DOCUMENTS

| | | |
|---|---|---|
| CN | 103513479 A | 1/2014 |
| CN | 104062817 A | 9/2014 |

\* cited by examiner

ARRAY SUBSTRATE, DISPLAY PANEL AND DISPLAY DEVICE

CROSS REFERENCE TO RELATED APPLICATIONS

The present application claims the priority of Chinese Patent Application No. 201510152788.2, titled "ARRAY SUBSTRATE, DISPLAY PANEL AND DISPLAY DEVICE", filed on Apr. 1, 2015 with the State Intellectual Property Office of People's Republic of China, which is incorporated herein by reference in its entirety.

FIELD

The disclosure relates to the technical field of touch display, and in particular to an array substrate, a display panel including the array substrate and a display device including the array panel.

BACKGROUND

In the initial stages of the development of touch display technologies, a touch display panel is formed by combining a touch panel and a display panel to achieve a touch display function. The touch panel and the display panel are needed to be prepared separately, thereby resulting in a high cost, a large thickness and a low productivity.

With the development of self-capacitive touch display integrated technology, a common electrode layer of an array substrate in the display panel may also serve as a touch electrode layer for self-capacitive touch detection, and a touch control operation and a display control operation are performed in a time-division manner by driving the common electrode in a time-division manner, thus the touch function and the display function may be achieved synchronously. In this way, the touch sensing electrode is integrated within the panel, thereby reducing the fabrication cost, improving the productivity and reducing the thickness of the panel greatly.

When the common electrode serves as the touch sensing electrode, the common electrode layer is needed to be divided into multiple separate touch electrodes. In order to control a touch operation and a display operation in a time-division manner, a touch sensing signal is needed to be provided for a respective touch electrode via a touch lead in a touch period of time, and a display driving voltage signal is needed to be provided for a respective touch electrode via the touch lead in a display period of time. However, the existing self-capacitive touch display device has a poor display effect.

SUMMARY

In view of above, an array substrate, a display panel and a display device are provided according to embodiments of the present disclosure. An auxiliary electrode is added, to increase storage capacitance and thus improve the display effect of the display device, where the auxiliary electrode is insulated from and overlaps with a pixel electrode, and is electrically connected to the common electrode.

To achieve the above objects, the technical solutions as follows are provided according to the disclosure. An array substrate is provided. The array substrate includes multiple gate lines and multiple data lines, a pixel electrode layer, a common electrode layer and multiple auxiliary electrodes. The gate lines are insulated from and intersect with the data lines, which defines multiple pixel units. The pixel electrode layer includes multiple pixel electrodes, and the pixel electrodes are disposed in the pixel units. The common electrode layer includes multiple common electrodes, and the common electrode also serves as a touch electrode. The auxiliary electrode is electrically connected to the touch electrode, is disposed in a different conductive layer from the pixel electrode, and overlaps with at least one of the pixel electrodes.

In addition, a display panel is further provided according to the disclosure, which includes the above-described array substrate.

Furthermore, a display device is provided according to the disclosure, which includes the above-described display panel.

Compared with the conventional technology, the technical solutions of the present disclosure have at least the following advantages.

An array substrate, a display panel and a display device are provided according to the embodiments of the disclosure. The array substrate includes: multiple gate lines and multiple data lines, where the gate lines are insulated from and intersect with the data lines, which defines multiple pixel units; a pixel electrode layer, where the pixel electrode layer includes multiple pixel electrodes, and the pixel electrodes are disposed in the pixel units; a common electrode layer, where the common electrode layer includes multiple common electrodes, and the common electrode also serves as a touch electrode; and multiple auxiliary electrodes, where the auxiliary electrode is electrically connected to the touch electrode, is disposed in a different conductive layer from the pixel electrode, and overlaps with at least one of the pixel electrodes.

It can be seen from the above description that, in the technical solutions according to the disclosure, the auxiliary electrode, which is insulated from and overlaps with the pixel electrode, is added, and the auxiliary electrode is electrically connected to the common electrode. Because storage capacitance is a sum of a capacitance between the auxiliary electrode and the pixel electrode, and also is a capacitance between the common electrode and the pixel electrode, the storage capacitance is increased, and the display device has an improved display effect as compared with the conventional technology.

BRIEF DESCRIPTION OF THE DRAWINGS

To describe the technical solutions for the embodiments of the present disclosure more clearly, the following briefly describes the drawings involved in the embodiments of the present disclosure. Apparently, the drawings described below are some embodiments, and persons of ordinary skill in the art can derive other drawings according to the drawings without any creative effort.

DETAILED DESCRIPTION OF THE EMBODIMENTS

The technical solutions of embodiments of the disclosure will be illustrated clearly and completely in conjunction with the drawings of the embodiments of the disclosure. Apparently, the described embodiments are only a few embodiments rather than all embodiments of the disclosure. Any other embodiments obtained by those skilled in the art on the basis of the embodiments of the present disclosure without creative work will fall within the scope of the present disclosure.

As described in BACKGROUND, the existing self-capacitive touch display device has a poor display effect. The inventor has found that, this problem is caused mainly by the fact that the storage capacitance between the pixel electrode and the common electrode corresponding thereto is small, which results in the poor display effect.

Figure 1:
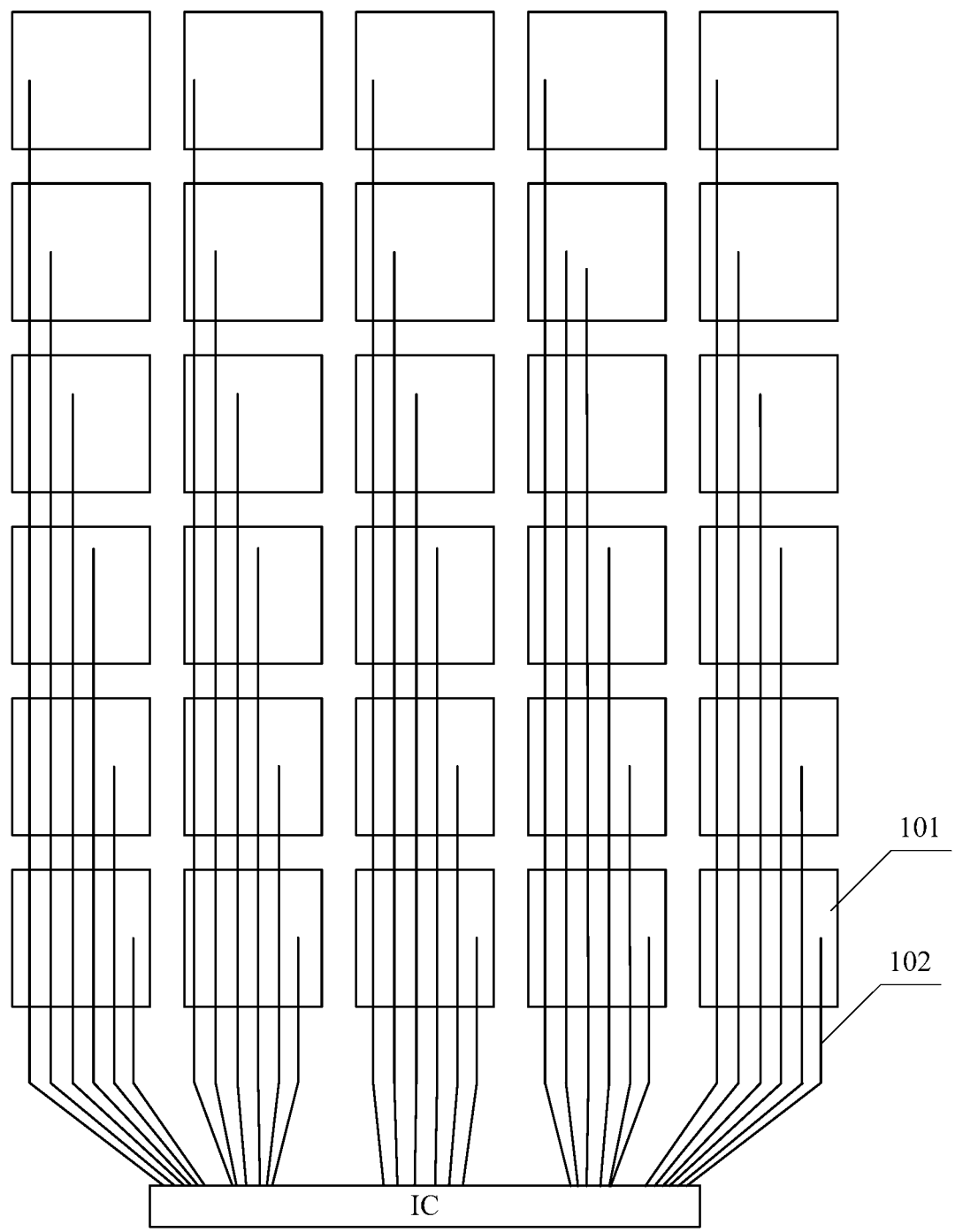
FIG. 1 is a schematic structural diagram of an existing array substrate.

FIG. 1 shows a schematic structural diagram of a conventional array substrate. A common electrode layer of the substrate array is divided into multiple separate common electrodes 101 and the common electrode also serves as the touch electrode. Each of the touch electrodes 101 is connected to a drive circuit IC via a respective touch lead 102. The drive circuit IC outputs and transmits a touch sensing signal to a respective touch electrode 101 via the touch lead 102.

In view of this, an array substrate is provided according to the embodiments of the disclosure. An auxiliary electrode, which is insulated from and overlaps with a corresponding common electrode, is added, and the auxiliary electrode is electrically connected to the common electrode, to increase the storage capacitance between the pixel electrode and the common electrode corresponding thereto. The array substrate according to the embodiments of the disclosure is described in details in conjunction with FIG. 2 to FIG. 11.

Figure 2:
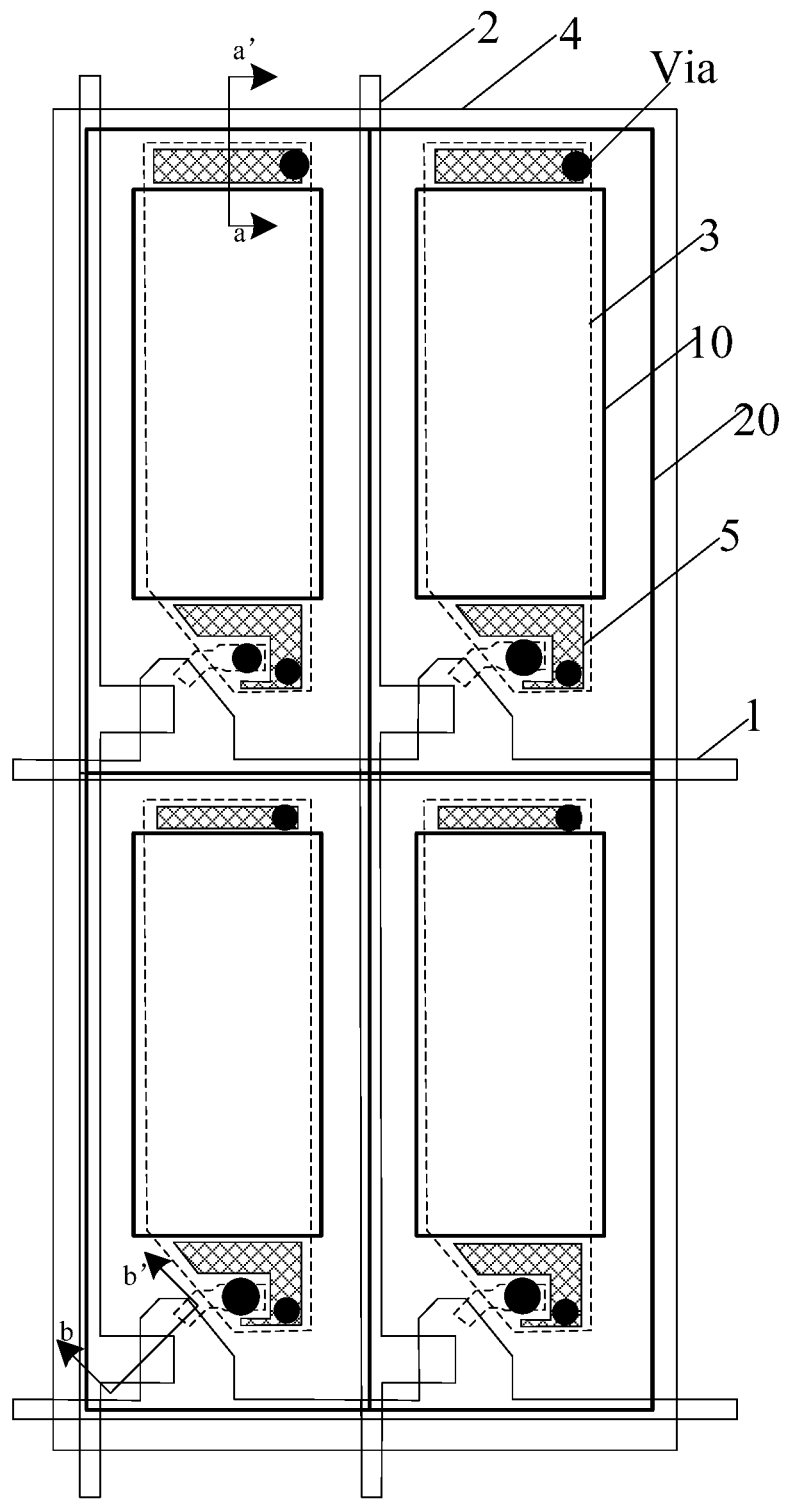
FIG. 2 is a schematic structural diagram of an array substrate according to an embodiment of the disclosure.

FIG. 2 shows a schematic structural diagram of an array substrate according to an embodiment of the disclosure. It should be noted that FIG. 2 illustrates the structure of one common electrode. In addition, the shape, the size, and the number of pixel elements are not defined in the embodiments of the disclosure. The array substrate includes multiple gate lines 1 and multiple data lines 2, where the gate lines 1 are insulated from and intersect with the data lines 2, which defines multiple pixel units. The array substrate includes a pixel electrode layer, where the pixel electrode layer includes multiple pixel electrodes 3, and the pixel electrodes 3 are disposed in the pixel units. The array substrate includes a common electrode layer, where the common electrode layer includes multiple common electrodes 4, and the common electrode 4 also serves as a touch electrode. The array substrate includes multiple auxiliary electrodes 5, where the auxiliary electrode 5 is electrically connected to the touch electrode 4, is disposed in a different conductive layer from the pixel electrode 3, and overlaps with at least one of the pixel electrodes 3.

In addition, the pixel unit includes a light transmitting region 10 and a light blocking region 20 surrounding the light transmitting region, where the pixel electrode 3 is disposed in the light transmitting region 10 of the pixel unit and is extended to the light blocking region 20. Furthermore, to avoid affection on the aperture ratio of the array substrate caused by the auxiliary electrode, the auxiliary electrode 5 is disposed in the light blocking region 20, which is not limited in the embodiments of the disclosure, and needs to be designed according to the actual application.

It can be seen from the above description that, in the technical solutions according to the disclosure, the auxiliary electrode, which is insulated from and overlaps with the pixel electrode, is added, and the auxiliary electrode is electrically connected to the common electrode. Because the storage capacitance is a sum of a capacitance between the auxiliary electrode and the pixel electrode, and is also a capacitance between the common electrode and the pixel electrode, the storage capacitance is increased, and the display device has an improved display effect as compared with the conventional technology.

The auxiliary electrode according to the embodiment of the disclosure needs to be electrically connected to the touch electrode to increase the storage capacitance between the touch electrode and the pixel electrode corresponding thereto. Since the auxiliary electrode is disposed in a different conductive layer from the pixel electrode, preferably, the auxiliary electrode is electrically connected to the touch electrode through a via hole (such as via hole Via in FIG. 2). Furthermore, in other embodiments of the disclosure, the auxiliary electrode and the common electrode may be connected to a frame region of the array substrate via leads respectively to achieve connection, which is not limited in the disclosure. In addition, in FIG. 2, when the pixel electrode is disposed on a side of the common electrode and the auxiliary electrode away from the substrate is taken as an example for illustration, the via hole may be disposed in the dashed box denoting the pixel electrode. When the pixel electrode is disposed between the common electrode and the auxiliary electrode, the via hole needs to be disposed outside the dashed box denoting the pixel electrode.

Figure 3:
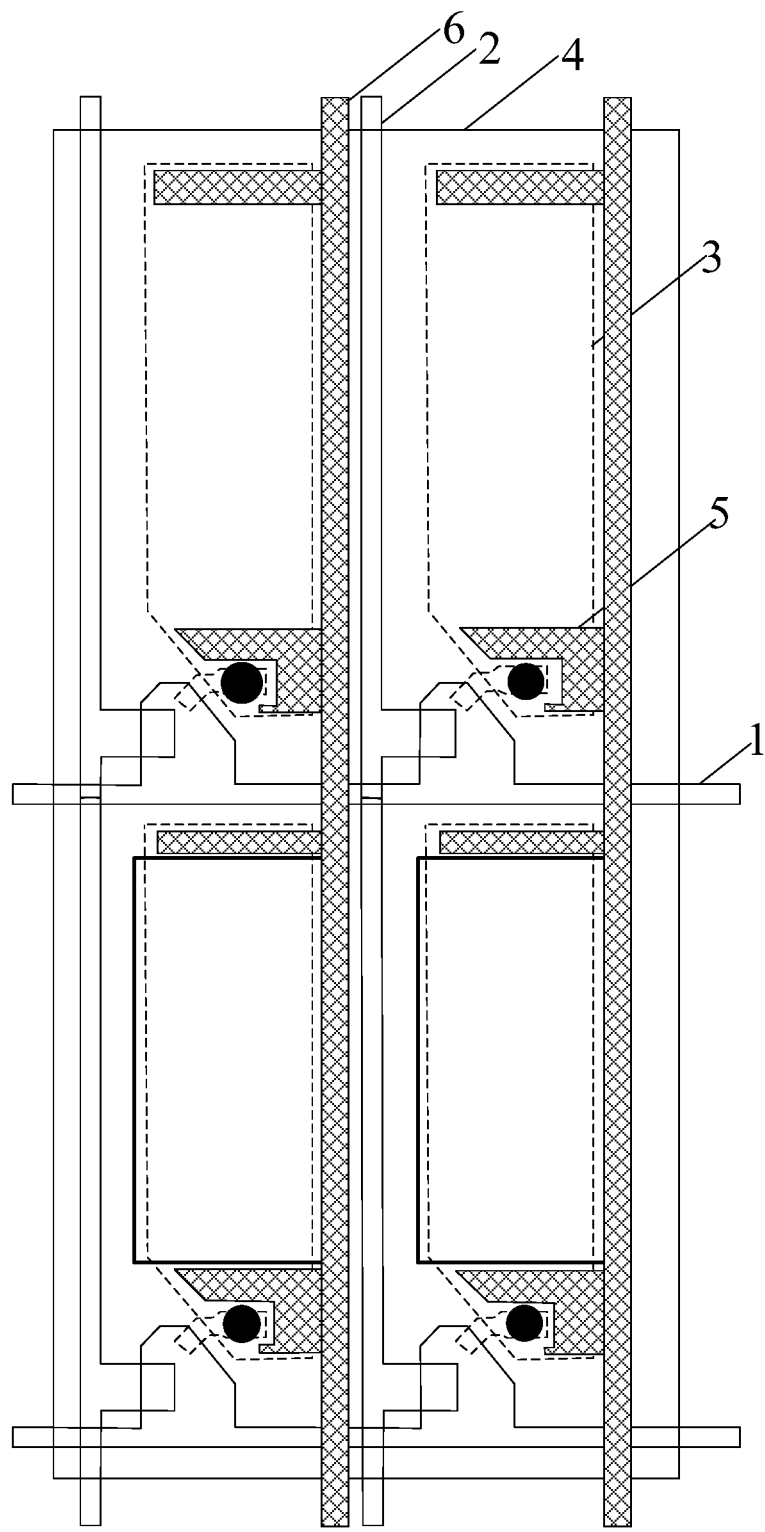
FIG. 3 is a schematic structural diagram of an array substrate according to another embodiment of the disclosure.

Alternatively, the auxiliary electrode may be disposed in a same conductive layer with a touch lead corresponding to the touch electrode and is connected to the touch lead. FIG. 3 shows a schematic structural diagram of an array substrate according to another embodiment of the disclosure. Similar to FIG. 2, FIG. 3 illustrates the structure of one common electrode, and the shape, the size, and the number of pixel elements is not limited in the embodiments of the disclosure. Other than the structure shown in FIG. 2, the array substrate shown in FIG. 3 further includes multiple electrode leads 6 each being electrically connected to one touch electrode, where a common voltage is applied to the touch electrode in the display period, and a touch detection signal is applied to the touch electrode in the touch period. The electrode lead 6 may be disposed in a same conductive layer as the auxiliary electrode 5, and the electrode lead 6 is connected to the auxiliary electrode 5.

The type of the array substrate according to the embodiments of the disclosure is not limited in the disclosure. For example, positions of the common electrode layer and the pixel electrode layer are not limited in the embodiments of the disclosure. The array substrate according to the embodiments of the disclosure is described in details in conjunction with FIG. 4 to FIG. 8.

Figure 4:
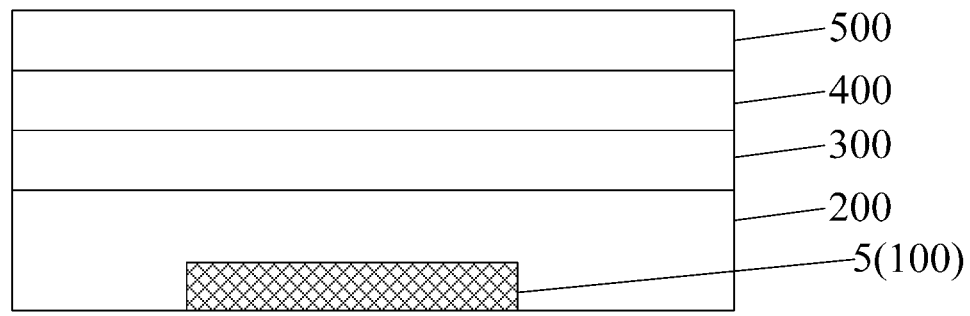
FIG. 4 is a section view of an array substrate taken along aa' in FIG. 2 according to an embodiment of the disclosure.

FIG. 4 shows a section view of an array substrate taken along aa' in FIG. 2 according to an embodiment of the disclosure. As shown in FIG. 4, in a light transmitting direction of the array substrate, the array substrate includes an auxiliary conductive layer 100 including an auxiliary electrode 5. The array substrate includes a first insulating layer 200 disposed on a surface of the auxiliary conductive layer 100. The array substrate includes a first electrode layer 300 disposed on a side of the first insulating layer 200 away from the auxiliary conductive layer 100. The array substrate includes a second insulating layer 400 disposed on a side of the first electrode layer 300 away from the auxiliary conductive layer 100. The array substrate includes a second electrode layer 500 disposed on a side of the second insulating layer 400 away from the auxiliary conductive layer 100.

Figure 5:
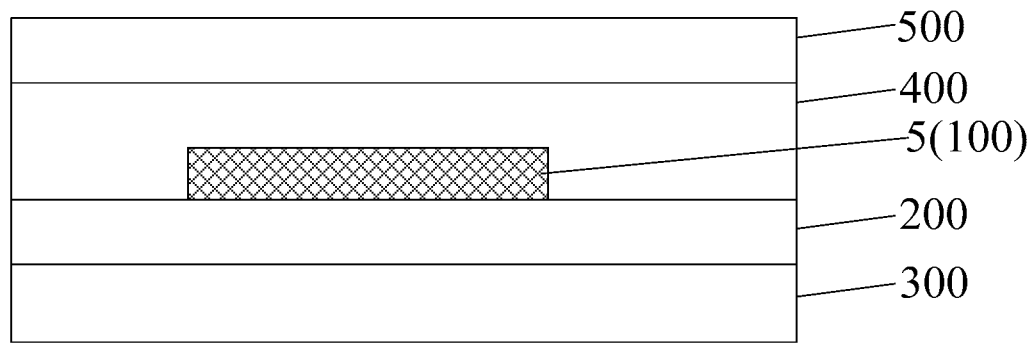
FIG. 5 is a section view of an array substrate taken along aa' in FIG. 2 according to another embodiment of the disclosure.

Alternatively, FIG. 5 shows a section view of an array substrate taken along aa' in FIG. 2 according to another embodiment of the disclosure, and as shown in FIG. 5 in a light transmitting direction of the array substrate, the array substrate includes a first electrode layer 300; a first insulating layer 200 disposed on a surface of the first electrode layer 300; an auxiliary conductive layer 100 disposed on a side of the first insulating layer 200 away from the first electrode layer 300, where the auxiliary conductive layer 100 includes an auxiliary electrode 5; a second insulating layer 400 disposed on a side of the auxiliary conductive layer 100 away from the first electrode layer 300; and a second electrode layer 500 disposed on a side of the second insulating layer 400 away from the first electrode layer 300.

Figure 6:
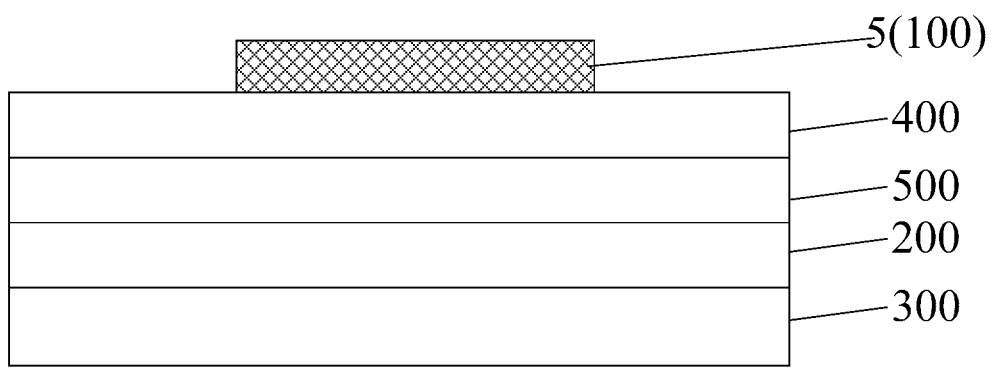
FIG. 6 is a section view of an array substrate taken along aa' in FIG. 2 according to still another embodiment of the disclosure.

Alternatively, FIG. 6 shows a section view of an array substrate taken along aa' in FIG. 2 according to still another embodiment of the disclosure, and as shown in FIG. 6, in a light transmitting direction of the array substrate, the array substrate includes a first electrode layer 300; a first insulating layer 200 disposed on a surface of the first electrode layer 300; a second electrode layer 500 disposed on a side of the first insulating layer 200 away from the first electrode layer 300; a second insulating layer 400 disposed on a side of the second electrode layer 500 away from the first electrode layer 300; and an auxiliary conductive layer 100 disposed on a side of the second insulating layer 400 away from the first electrode layer 100, where the auxiliary conductive layer 100 includes an auxiliary electrode 5.

Figure 7:
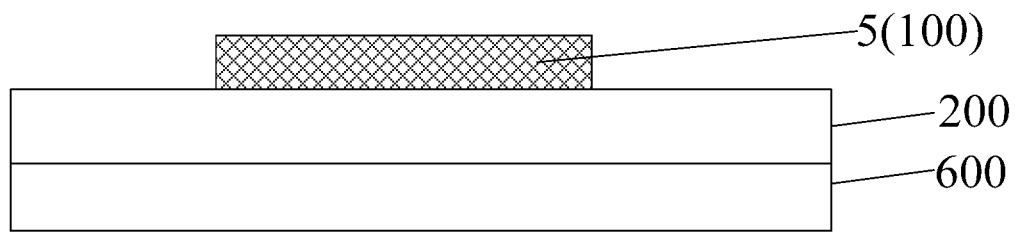
FIG. 7 is a section view of an array substrate taken along aa' in FIG. 2 according to still another embodiment of the disclosure.

Alternatively, FIG. 7 shows a section view of an array substrate taken along aa' in FIG. 2 according to still another embodiment of the disclosure, and as shown in FIG. 7, in a light transmitting direction of the array substrate, the array substrate includes a drive electrode layer 600, including a pixel electrode layer and a common electrode layer; a first insulating layer 200 disposed on a surface of the drive electrode layer 600; and an auxiliary conductive layer 100 disposed on a side of the first insulating layer 200 away from the drive electrode layer 600, where the auxiliary conductive layer 100 includes an auxiliary electrode 5.

Figure 8:
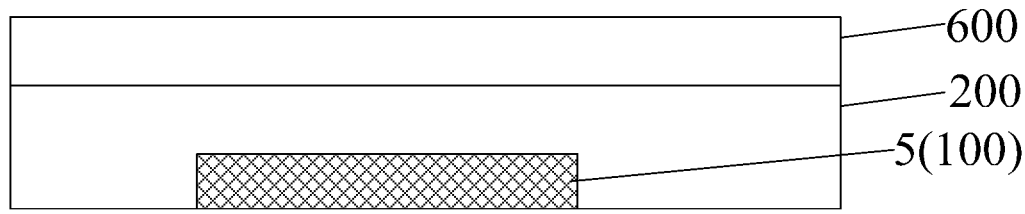
FIG. 8 is a section view of an array substrate taken along aa' in FIG. 2 according to still another embodiment of the disclosure.

Alternatively, FIG. 8 shows a section view of an array substrate taken along aa' in FIG. 2 according to still another embodiment of the disclosure, and as shown in FIG. 8, in a light transmitting direction of the array substrate, the array substrate includes an auxiliary conductive layer 100, including an auxiliary electrode 5; a first insulating layer 200 disposed on a surface of the auxiliary conductive layer 100; a drive electrode layer 600 disposed on a side of the first insulating layer 200 away from the auxiliary conductive layer 100, where the drive electrode layer 600 includes a pixel electrode layer and a common electrode layer.

In the above description, the first electrode layer according to the embodiments of the disclosure is the common electrode layer, and the second electrode layer is the pixel electrode layer; or the first electrode layer is the pixel electrode layer, and the second electrode layer is the common electrode layer. Positions of the common electrode layer and the pixel electrode layer are not limited in the embodiments of the disclosure.

It can be seen from the above description that, positions of the pixel electrode layer and the common electrode layer of the array substrate are not limited in the embodiments of the disclosure. In addition, a structure of a transistor of the array substrate is also not limited in the embodiments of the disclosure. The transistor in the array substrate may be a top-gate transistor or a bottom-gate transistor. The array substrate with a top-gate transistor or a bottom-gate transistor according to the embodiments of the disclosure is described in details in conjunction with FIG. 9 and FIG. 10.

Figure 9:
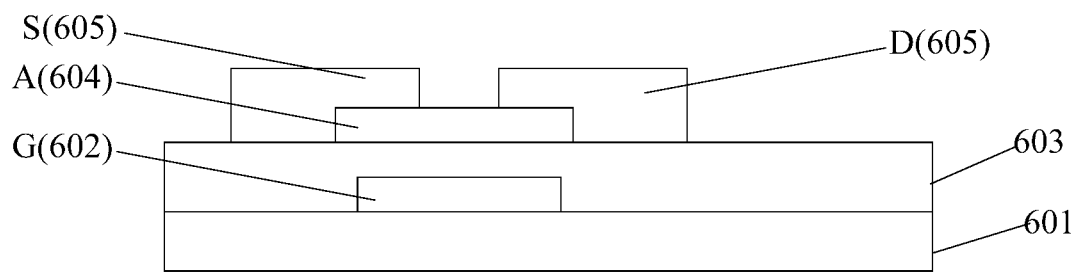
FIG. 9 is a section view of an array substrate taken along bb' in FIG. 2 according to an embodiment of the disclosure.

FIG. 9 shows a section view of an array substrate taken along bb' in FIG. 2 according to an embodiment of the disclosure, and as shown in FIG. 9, a thin film transistor of the array substrate may be a bottom-gate thin film transistor, that is, in a light transmitting direction of the array substrate, the array substrate includes a substrate 601; a first conductive layer 602 disposed on any surface of the substrate 601, where the first conductive layer 602 includes a gate line and a gate G; a gate dielectric layer 603 disposed on a side of the first conductive layer 602 away from the substrate 601; a semiconductor layer 604 disposed on a side of the gate dielectric layer 603 away from the substrate 601, where the semiconductor layer 604 includes an active region A; and a second conductive layer 605 disposed on a side of the semiconductor layer 604 away from the substrate 601, where the second conductive layer 605 includes a data line, a source S and a drain D; the thin film transistor is formed by the gate G, the active region A, the source S and the drain D.

Figure 10:
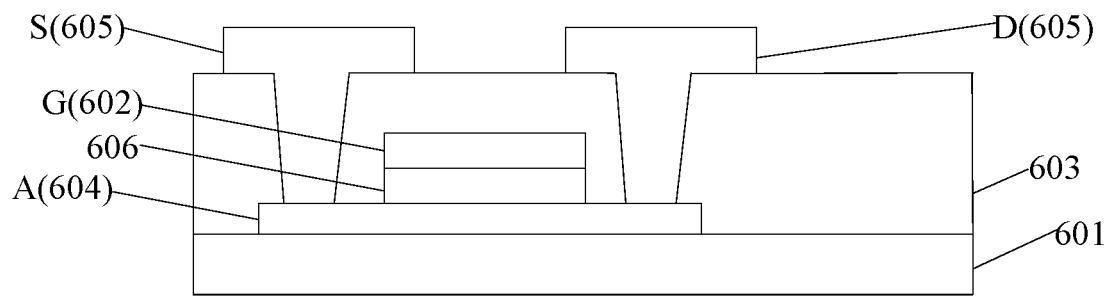
FIG. 10 is a section view of an array substrate taken along bb' in FIG. 2 according to another embodiment of the disclosure.

Alternatively, FIG. 10 shows a section view of an array substrate taken along bb' in FIG. 2 according to another embodiment of the disclosure, and as shown in FIG. 10, a thin film transistor of the array substrate may be a top-gate thin film transistor, that is, in a light transmitting direction of the array substrate, the array substrate includes a substrate 601; a semiconductor layer 604 disposed on a surface of the substrate 601, where the semiconductor layer 604 includes an active region A; a gate insulating layer 606 disposed on a side of the semiconductor layer 604 away from the substrate 601; a first conductive layer 602 disposed on a side of the gate insulating layer 606 away from the substrate 601, where the first conductive layer 602 includes a gate line and a gate G; a gate dielectric layer 603 disposed on a side of the first conductive layer 602 away from the substrate 601; and a second conductive layer 605 disposed on a side of the gate dielectric layer 603 away from the substrate 601. The second conductive layer 605 includes a data line and a source S and a drain D. The thin film transistor is formed by the gate G, the active region A, the source S and the drain D. It should be noted that, when the thin film transistor is the top-gate thin film transistor, a light blocking layer needs to be disposed between the active region and the substrate.

Figure 11:
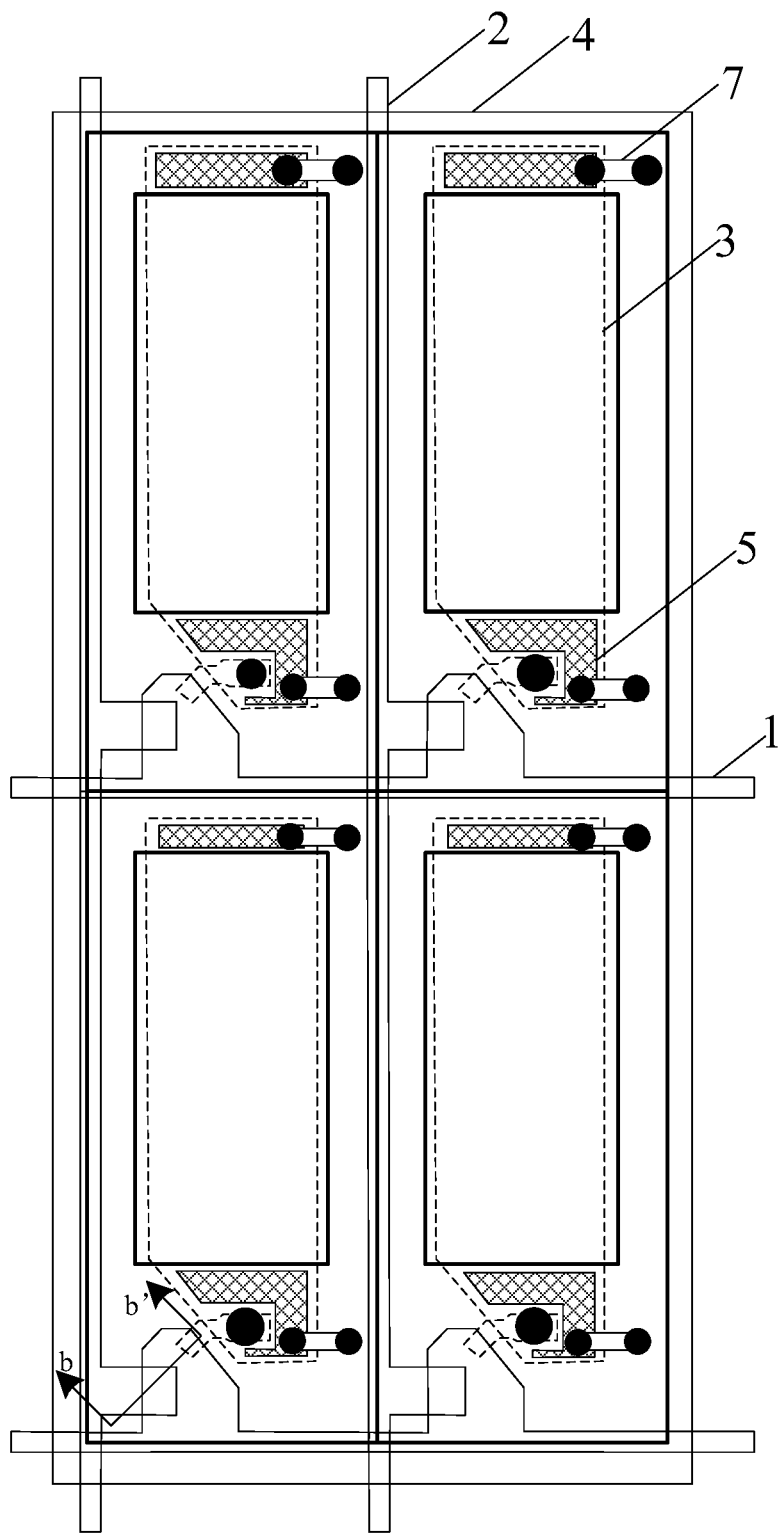
FIG. 11 is a schematic structural diagram of an array substrate according to another embodiment of the disclosure.

In addition, in the array substrate shown in FIG. 4 and FIG. 5, when the first electrode layer is the common electrode layer, and the second electrode layer is the pixel electrode layer, the auxiliary electrode may alternatively be electrically connected to the touch electrode through the pixel electrode layer. FIG. 11 shows a schematic structural diagram of an array substrate according to another embodiment of the disclosure, and as shown in FIG. 11, when a first electrode layer is a common electrode layer, and a second electrode layer is a pixel electrode layer, the array substrate further includes a connection electrode 7, which is disposed in a different conductive layer from the auxiliary electrode 5 and the touch electrode 4, and is electrically connected to the auxiliary electrode 5 and the touch electrode 4 through via holes respectively. The connection electrode 7 is also disposed in the pixel electrode layer and is insulated from the pixel electrode.

A display panel is further provided according to the disclosure, which includes the above array substrate. In addition, a display device is provided according to the disclosure, which includes the above-described display panel. An array substrate, a display panel and a display device are provided according to embodiments of the disclosure. The array substrate includes: multiple gate lines and multiple data lines; a pixel electrode layer; a common electrode layer and multiple auxiliary electrodes. The gate lines are insulated from and intersect with the data lines, which define multiple pixel units. The pixel electrode layer includes multiple pixel electrodes, which are disposed in the pixel units. The common electrode layer includes multiple common electrodes, and the common electrode also serves as a touch electrode. The auxiliary electrode is electrically connected to the touch electrode, which is disposed in a different conductive layer from the pixel electrode, and overlaps with at least one of the pixel electrodes.

It can be seen from the above description that, in the technical solutions according to the disclosure, the auxiliary electrode, which is insulated from and overlaps with the pixel electrode, is added, and the auxiliary electrode is electrically connected to the common electrode, such that the storage capacitance is a sum of a capacitance between the auxiliary electrode and the pixel electrode, and a capacitance between the common electrode and the pixel electrode, thus the storage capacitance is increased, and the display device has an improved display effect as compared with the conventional technology.

The description of the embodiments disclosed herein enables those skilled in the art to implement or use the present disclosure. Numerous modifications to the embodiments are obvious to those skilled in the art, and the general principle herein can be implemented in other embodiments without deviation from the spirit or scope of the present disclosure. Therefore, the present disclosure is not limited to the embodiments described herein, but in accordance with the widest scope consistent with the principle and novel features disclosed herein.

The invention claimed is:

1. An array substrate, comprising:
   a plurality of gate lines and a plurality of data lines, wherein the gate lines are insulated from and intersect with the data lines, which define a plurality of pixel units;
   a pixel electrode layer comprising a plurality of pixel electrodes, the pixel electrodes being disposed in the pixel units;
   a common electrode layer including a plurality of common electrodes, the common electrode also serves as a touch electrode;
   a plurality of electrode leads, wherein each of the plurality of electrode leads is electrically connected to a touch electrode, wherein a common voltage is applied to the touch electrode in a display period and a touch detection signal is applied to the touch electrode in a touch period; and
   a plurality of auxiliary electrodes, which is electrically connected to the touch electrode, is disposed in a different conductive layer from the pixel electrode, and overlaps with at least one of the pixel electrodes, wherein
   each of the plurality of pixel units comprises a light transmitting region and a light blocking region surrounding the light transmitting region, the pixel electrode is disposed in the light transmitting region of the pixel unit and part of the pixel electrode is extended to the light blocking region, and the auxiliary electrode is disposed within the light blocking region, wherein the auxiliary electrode overlaps with the part of the pixel electrode in the light blocking region, and
   the plurality of auxiliary electrodes is disposed in a same conductive layer as the plurality of electrode leads, and each of the plurality of auxiliary electrodes is connected to one of the plurality of electrode leads.

2. The array substrate according to claim 1, wherein the auxiliary electrode is electrically connected to the touch electrode through a via hole.

3. The array substrate according to claim 1, wherein in a light transmitting direction of the array substrate, the array substrate comprises:
   an auxiliary conductive layer comprising the auxiliary electrodes;
   a first insulating layer disposed on a surface of the auxiliary conductive layer;
   a first electrode layer disposed on a side of the first insulating layer away from the auxiliary conductive layer;
   a second insulating layer disposed on a side of the first electrode layer away from the auxiliary conductive layer; and
   a second electrode layer disposed on a side of the second insulating layer away from the auxiliary conductive layer.

4. The array substrate according to claim 1, wherein in a light transmitting direction of the array substrate, the array substrate comprises:
   a first electrode layer;
   a first insulating layer disposed on a surface of the first electrode layer;
   an auxiliary conductive layer disposed on a side of the first insulating layer away from the first electrode layer, wherein the auxiliary conductive layer comprises the auxiliary electrodes;
   a second insulating layer disposed on a side of the auxiliary conductive layer away from the first electrode layer; and
   a second electrode layer disposed on a side of the second insulating layer away from the first electrode layer.

5. The array substrate according to claim 1, wherein in a light transmitting direction of the array substrate, the array substrate comprises:
   a first electrode layer;
   a first insulating layer disposed on a surface of the first electrode layer;
   a second electrode layer disposed on a side of the first insulating layer away from the first electrode layer;
   a second insulating layer disposed on a side of the second electrode layer away from the first electrode layer; and an auxiliary conductive layer disposed on a side of the second insulating layer away from the first electrode layer, the auxiliary conductive layer comprising the auxiliary electrodes.

6. The array substrate according to claim 1, wherein in a light transmitting direction of the array substrate, the array substrate comprises:
a drive electrode layer comprising the pixel electrode layer and the common electrode layer;
a first insulating layer disposed on a surface of the drive electrode layer; and
an auxiliary conductive layer disposed on a side of the first insulating layer away from the drive electrode layer, the auxiliary conductive layer comprising the auxiliary electrodes.

7. The array substrate according to claim 1, wherein in a light transmitting direction of the array substrate, the array substrate comprises:
an auxiliary conductive layer comprising the auxiliary electrode;
a first insulating layer disposed on a surface of the auxiliary conductive layer;
a drive electrode layer disposed on a side of the first insulating layer away from the auxiliary conductive layer, the drive electrode layer comprising the pixel electrode layer and the common electrode layer.

8. The array substrate according to claim 3, wherein the first electrode layer is the common electrode layer, the second electrode layer is the pixel electrode layer, and
the array substrate further comprises a connection electrode, wherein the connection electrode is disposed in a different conductive layer from the auxiliary electrode and the touch electrode, and the connection electrode is electrically connected to the auxiliary electrode and the touch electrode through via holes respectively.

9. The array substrate according to claim 4, wherein the first electrode layer is the common electrode layer, the second electrode layer is the pixel electrode layer, and
the array substrate further comprises a connection electrode, wherein the connection electrode is disposed in a different conductive layer from the auxiliary electrode and the touch electrode, and the connection electrode is electrically connected to the auxiliary electrode and the touch electrode through via holes respectively.

10. The array substrate according to claim 5, wherein the first electrode layer is the common electrode layer, the second electrode layer is the pixel electrode layer, and
the array substrate further comprises a connection electrode, wherein the connection electrode is disposed in a different conductive layer from the auxiliary electrode and the touch electrode, and the connection electrode is electrically connected to the auxiliary electrode and the touch electrode through via holes respectively.

11. The array substrate according to claim 3, wherein the connection electrode is disposed in the pixel electrode layer.

12. The array substrate according to claim 3, wherein the first electrode layer is the common electrode layer and the second electrode layer is the pixel electrode layer; or
the first electrode layer is the pixel electrode layer and the second electrode layer is the common electrode layer.

13. The array substrate according to claim 4, wherein the first electrode layer is the common electrode layer and the second electrode layer is the pixel electrode layer; or
the first electrode layer is the pixel electrode layer and the second electrode layer is the common electrode layer.

14. The array substrate according to claim 5, wherein the first electrode layer is the common electrode layer and the second electrode layer is the pixel electrode layer; or
the first electrode layer is the pixel electrode layer and the second electrode layer is the common electrode layer.

15. The array substrate according to claim 1, wherein in a light transmitting direction of the array substrate, the array substrate comprises:
a substrate;
a first conductive layer disposed on any surface of the substrate, wherein the first conductive layer comprises the gate line and a gate;
a gate dielectric layer disposed on a side of the first conductive layer away from the substrate;
a semiconductor layer disposed on a side of the gate dielectric layer away from the substrate, wherein the semiconductor layer comprises an active region; and
a second conductive layer disposed on a side of the semiconductor layer away from the substrate, wherein the second conductive layer comprises the data line and a source and a drain, and a thin film transistor is formed by the gate, the active region, the source and the drain.

16. The array substrate according to claim 1, wherein in a light transmitting direction of the array substrate, the array substrate comprises:
a substrate;
a semiconductor layer disposed on any surface of the substrate, the semiconductor layer comprising an active region;
a gate insulating layer disposed on a side of the semiconductor layer away from the substrate;
a first conductive layer disposed on a side of the gate insulating layer away from the substrate, the first conductive layer comprising the gate line and a gate;
a gate dielectric layer disposed on a side of the first conductive layer away from the substrate; and
a second conductive layer disposed on a side of the gate dielectric layer away from the substrate, the second conductive layer comprising the data line, a source and a drain, and a thin film transistor is formed by the gate, the active region, the source and the drain.

17. A display panel, comprising the array substrate according to claim 1.

18. A display device, comprising the display panel according to claim 17.

* * * * *